United States Patent [19]

Langston

[11] Patent Number: 5,112,666

[45] Date of Patent: May 12, 1992

[54] CBW PROTECTIVE CLOTHING

[75] Inventor: Richard D. Langston, Wokingham, England

[73] Assignee: Charcoal Cloth Limited, Berkshire, England

[21] Appl. No.: 457,683

[22] PCT Filed: Jun. 21, 1988

[86] PCT No.: PCT/GB88/00475

§ 371 Date: Dec. 21, 1988

§ 102(e) Date: Dec. 21, 1988

[87] PCT Pub. No.: WO88/10134

PCT Pub. Date: Dec. 29, 1988

[30] Foreign Application Priority Data

Jun. 22, 1987 [GB] United Kingdom ............... 8714535

[51] Int. Cl.⁵ .............................................. B32B 3/06
[52] U.S. Cl. .................................... 428/104; 428/102;
428/246; 428/252; 428/257; 428/253; 428/283;
428/284; 428/287; 428/408; 428/421; 428/446;
428/198; 428/920
[58] Field of Search ............... 418/246, 408, 219, 266,
418/267, 920, 284, 198, 252, 257, 287, 283, 421,
446, 102, 104

[56] References Cited

U.S. PATENT DOCUMENTS 3,769,144 10/1973 Economy et al. ................ 161/50
3,850,785 11/1974 McQuade et al. ................ 161/88
4,217,386 8/1980 Arons et al. ..................... 428/198
4,726,978 2/1988 Simpson .......................... 428/198
4,869,947 9/1989 Kirayoglu ....................... 428/246

FOREIGN PATENT DOCUMENTS 0150124 8/1987 European Pat. Off. .
1360277 7/1974 United Kingdom .
2096536 10/1982 United Kingdom .
2137068 10/1984 United Kingdom .

Primary Examiner—James J. Bell
Attorney, Agent, or Firm—Baker & Daniels

[57] ABSTRACT

A composite material suitable for use as CBW protective clothing comprises, in combination:
an outer layer (1) of an abrasion-resistant, water-repellent material;
an intermediate layer (2) comprising activated charcoal cloth treated to provide liquid-repellency; and
an inner layer (3) of an abrasion-resistant material laminated to the intermediate layer.

This composite is light, breathable and has low thermal insulation properties, but provides good chemical protection.

21 Claims, 1 Drawing Sheet

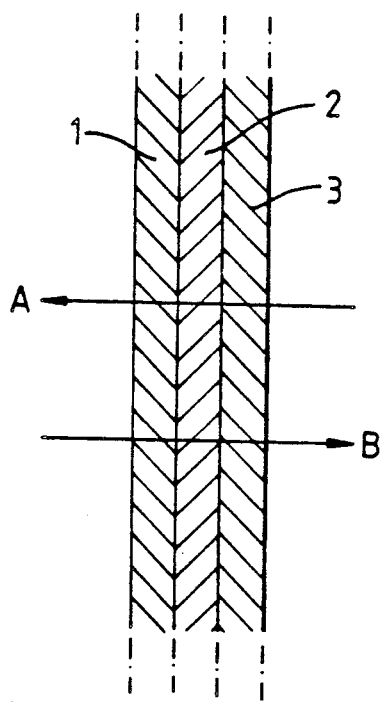

CBW PROTECTIVE CLOTHING

FIELD OF THE INVENTION

This invention relates to protective materials, and especially to clothing intended to be worn as complete protection from a contaminated environment.

BACKGROUND OF THE INVENTION

Protective suits may be required to protect the wearer against a variety of chemical and biological agents. For example, protection is required against droplets of certain agents which may affect the skin, and against vapours of the same or other agents which are a threat to the respiratory system. Toxic biological agents may be in the form of spores and are therefore a particulate threat, which can only cause casualties if inhaled or if allowed to penetrate into the body through an open wound. There are also biological agents which present a hazard if they are delivered in the form of a liquid agent which can penetrate the skin.

Heat stress is universally recognised as being the greatest limiting factor for the achievement of a suitable protective clothing system. Attaining total chemical protection in a clothing system is not difficult. Impermeable materials such as butyl rubber are available to give such protection. However, any non-breathable clothing system will prove unwearable under most conditions in a matter of minutes. It is no good providing total protection if it results in the wearer losing his effectiveness.

It has therefore been attempted to develop an anti-gas fabric which not only protects but which allows air to penetrate and water vapour from the body to permeate out. Filtration of the chemical liquids and vapours is therefore required, and activated carbon is a well-known and effective adsorbent.

All clothing systems need to be flexible, and therefore early development revolved around impregnating a suitable textile carrier with activated carbon adhered to it, i.e. creating a synthetic activated carbon material. Many approaches have been developed: impregnated polyurethane foam, non-wovens with bonded charcoal, carbon-filled spheres bonded to a carrier material. All of these approaches have two major limitations, i.e.
a) inability to provide sufficient carbon on the surface of the carrying material without blocking off its breathability; and
b) degradation of the charcoal due to aging of the bonding process.

Other common limitations present in some or all of these systems are: shedding of charcoal through abrasion, lack of launderability and, most important of all, lack of breathability and high thermal insulation properties.

There are different aims reflected in known protective clothing systems. Each system reflects both the technology available and a particular protection philosophy.

For example, if it is decided that very high protection levels are necessary, an anti-gas system may be based on a polyurethane foam loaded with activated carbon powder. The disadvantages encountered by such a system are as follows: the high insulation properties of the polyurethane foam make the physiological load on the wearer undesirably high, and the high carbon loading necessitated by the high protection factor increases the weight of the garment and reduces its breathability, and therefore also increases the physiological load.

An alternative aim is to balance adequate protection and a reasonable physiological burden. To this end, a known anti-gas fabric is a fluorochemical-treated nonwoven which has been coated with fine active carbon particles fixed with a polymeric binder. However, although the physiological burden on the wearer is reduced in this case, the protection offered by this system is not sufficient to allow it to be worn as an integral uniform, only as a protective overgarment.

PRIOR ART

GB-A-2096536 describes a composite protective material comprising a two-layer cloth structure, one layer being oil/water-repellent and the other being an adsorptive charcoal. For use as a protective material, 4 layers are required. The innermost layer is moisture-absorbent, but will not prevent sweat poisoning.

EP-A-0150124 describes a protective garment comprising at least one layer of an activated woven carbon fabric and a highly absorbent rayon layer as well as a ribbed fabric such as corduroy on the body side of the carbon fabric. The preferred embodiment of the invention requires three layers of activated charcoal fabric, for protection against chemical agents; it is doubtful that even three layers would prevent liquid agent from penetrating the composite.

GB-A-1360277 discloses a casualty bag comprising a non-woven material treated for liquid-repellency to which activated charcoal powder is bonded, i.e. a two-layer protection composite. It is suggested that activated charcoal cloth is suitable, but liquid strike-through could not then be avoided.

All the systems described above rely on some form of liquid-repelling barrier to hold liquids away from the charcoal. The charcoal then serves to absorb vapours only. Another layer of material is also required to protect the charcoal from water vapour and water, and to prevent sweat poisoning.

GB-A-2137608 described activated charcoal which has been treated to provide liquid-repellency.

SUMMARY OF THE INVENTION

It is an object of the present invention to provide a protective clothing system designed to have the following characteristics: (i) a high level of protection, (ii) low physiological load, (iii) resistance to abrasion, (iv) flame-retardant protection, (v) long wear times, (vi) good aging characteristics, and (vii) launderability.

According to the present invention, a composite suitable for use as a protective material comprises, in combination:

(1) an outer layer of an abrasion-resistant, flame-retardant, water-repellent material;

(2) an intermediate layer comprising activated charcoal cloth treated to provide liquid-repellency; and (3) an inner layer of an abrasion-resistant material.

Clothing using material of the invention offers a high level of protection, such that no conventional clothing need be worn underneath. The physiological load on the wearer is low.

DESCRIPTION OF THE INVENTION

A highly schematic cross-section of an embodiment of the invention is shown (not to scale) in the accompanying drawing, by way of illustration. The drawing shows an outer layer 1, an intermediate layer 2 and an inner layer 3, respectively of materials as described above. Arrow A indicates the direction of passage of perspiration from the body of the wearer to the atmosphere; arrow B indicates the (opposite) direction of passage of air filtered by the material.

The intermediate and inner layers (2 and 3) are usually laminated together. The outer layer 1 may be laminated to the intermediate layer, but lamination together of all three layers may give the composite unnecessarily high rigidity. It is therefore preferred that the outer or inner material (and usually the outer) is sewn to the remainder of the composite material, e.g. at the seams of a suit.

A composite material according to the invention may be made up into an article of protective clothing such as a casualty bag or protective suiting, industrial or agricultural, especially a CBW suit, one-piece or two-piece, and various components of complete body cover, e.g. hood and mitts. Velcro (Trade Mark) fastenings and zips may be provided, in conventional manner.

The material of the outer layer may be woven or non-woven, and will usually have a degree of oil-repellency. An example of a suitable material is a two-by-one twill fabric having a polyamide warp thread and a modified acrylic weft thread, e.g. at a make-up weight of 118 g/m$^2$. Other examples are woven or non-woven aramid fibre materials, e.g. as sold as Nomex, (Trade Mark), another fire-resistant or chemical-resistant breathable fabric, or a water-resistant breathable fabric such as Gore-Tex (Trade Mark).

This outer material should preferably also be treated with a, say, silicone water-repellent and a fire-retardant additive. The material may be infra-red reflective. It will usually be showerproof but is not necessarily waterproof.

The intermediate layer serves to adsorb poisonous fumes, while allowing the inward passage of air and the outward transmission of water vapour. This layer may comprise activated charcoal cloth which has been treated as described in GB-A-2137608, the contents of which are incorporated herein by way of reference. The active carbon layer may include a gas permeable surface coating of particulate hydrophobic material which renders the active carbon waterproof. Modified PTFE, or a higher loading of PTFE than is generally described in GB-A-2137608 may be used, to increase liquid repellency, as desired.

Activated charcoal cloth (ACC) is an activated carbon adsorbent available in the form of a woven, non-woven or knitted cloth of 100% pure activated charcoal. Therefore, it can be utilised like a normal textile and can be directly laminated to other textile materials. Further, as it does not comprise a "carrying" material which has been bonded with activated charcoal it does not shed its charcoal in handling and it does not harden or degrade once the bonding agent ages. Under humid or wet conditions ACC is proven to significantly outperform all other available forms of activated charcoal.

The inner layer acts as a lining material, providing the product with increased tensile strength, abrasion resistance and comfort (if, as may be the case, it is worn next to the skin). Its extensibility should not be significantly greater than that of the intermediate layer, to present the latter breaking. This inner layer may be non-woven or woven. The lamination of the inner and intermediate layers causes no decline in adsorptive performance or in storage life of the charcoal cloth.

The weight of the three-layer composite of the invention may be, for example, no more than 500, 450, 400 or 375, e.g. about 350, g/m$^2$. It is breathable, having an air permeability of at least 25, 30, 35 or, most preferably, 40, and up to 100, e.g. about 45–50, cm$^3$/cm$^2$/sec at 10 mm w.g. It allows the outward passage of perspiration, expressed by water vapour transmission values of preferably at least 1500, more preferably at least 2500, and most preferably 3000 or above, for example up to 5000, e.g. 3500–4000, g/m$^2$/24 h at 100% relative humidity differential, at 37° C. The composite yet offers good chemical protection, of at least 4, preferably at least 6, more preferably at least 8, hours in the second of the mustard liquid tests given in the Examples (below). Protection may be effective after at least 30 days' continuous wear. Storage stability may be up to 25 years under normal conditions, in sealed packaging.

Protective material according to the invention can provide greater protection from a toxic environment than the second type of known material (involving fixed carbon particles) described above. Moreover, the use of ACC imposes a very low physiological load.

Once encapsulated in the recommended materials composite, charcoal cloth is completely protected from abrasion. As it is a 100% pure activated carbon fabric, the carbon cannot detach as it has been proven to do with powder-loaded foams or bonded carbon spheres.

ACC is a non-flammable material. Although all protective clothing systems will have a flame-retardant outer material, the application of heat or flame to ACC will not cause it to melt or soften. Foam-backed materials and the bonding agents used to attach carbon to carrier materials could suffer adversely from the application of heat or flame.

All protective clothing systems should be constructed such that they can endure continuous wear for 30 days. ACC would not suffer any degradation of its adsorptive performance during this period even after total immersion in water. ACC in clothing systems can be laundered, provided that detergents are not used.

As ACC contains no bonding agents, no aging occurs in its adsorptive performance or its woven structure when in sealed packages. Its shelf-life is therefore infinite in these conditions, unlike all other forms of pseudo-carbon materials.

The high breathability of the novel material has the important advantage that it should allow protective suits to incorporate areas of impermeable materials to provide protection against sustained abrasion to vulnerable areas and increased protection against areas of maximum threat, i.e. shoulders, knees, elbows and trouser seat, without greatly increasing the physiological load on the wearer.

The following Examples illustrate the invention. The "outer", "intermediate" and "inner" materials are those defined by this specification.

EXAMPLE 1

Outer layer: to British Ministry of Defence Specification UK/SC/3988C, cloth, twill, modacrylic and nylon, olive drab or disruptively patterned, water-repellent and flame-retardant.

Intermediate layer: Activated Charcoal Cloth, grade FM1/250 available from Charcoal Cloth Limited, fluorochemically-treated to impart oil and water-repellency.

Inner layer: Laminated to the inner surface of the charcoal cloth, a woven Kevlar material (100% T-29

Kevlar 1.5 dpf, yarn 80/2 cc, plain weave 50×40 warp and fill, 7.5 kg/m²), bonded using heat-fusible polyamide dot coating.

| Physical properties of the composite | |
|---|---|
| Mass per unit area | approx. 355 g/m² (dry) |
| Breaking strength | >190 N/cm |
| Air permeability | approx. 44 cm³/cm²/sec at 10 mm w.g. |
| Water Vapour Transmission (at 100% RH Differential, 37° C.) | approx. 3600 g/m²/24 hrs. |

The intermediate-inner layer laminate had, for the same four properties, values of 225, 150, 68 and more than 4000 g/m²/24 h.

EXAMPLE 2

Example 1 was repeated, but using as the outer layer olive-drab, water-repellent woven Nomex 456 fabric (comprising 95% coloured Nomex 1 5 dpt and 5% T-29 Kevlar 1.5 dpf, yarn 37/2 cc, plain weave 70×47 warp-and-fill, 15.25 kg/m²). The composite weighed 360 g/m² (dry), the air permeability was 47 units; otherwise the properties were substantially the same as in Example 1.

TESTS

1 μg droplets of liquid mustard were placed on the outer surface of the sample under test. The sample sat on a piece of test paper which is sensitive to mustard penetration, in vapour or liquid form, at levels down to below 1 μg per drop of applied liquid. Detection of penetration is seen by a colour change on the indicator paper from red to blue. For convenience, the sample and test paper were placed on a glass plate, and a time lapse camera and clock were set up under the sample to record the appearance of colour changes with time, even whilst the sample is unattended, e.g. overnight.

Liquid mustard drops were applied in isolation (in which case each droplet was covered by a polythene cover to prevent evaporation away from the immediate area of the droplet), or at coverages of up to 9 drops per 9 cm² (in which case a 0.5 m/sec airflow was passed over the sample surfaces and the droplets were uncovered).

The products of Examples 1 and 2 achieved similar protection times in both tests. No liquid or vapour penetration of the samples occurred even after 6 days.

The products of the Examples can satisfactorily be sewn together into CBW protective clothing or other items, as described above.

I claim:

1. A multi-ply material suitable for use as a protective material, which comprises, in combination:
   (1) an outer layer of an abrasion-resistant, water-repellent material;
   (2) an intermediate layer comprising activated charcoal cloth treated to provide liquid-repellency; and
   (3) an inner layer of an abrasion-resistant material, said intermediate layer being adhesively bonded to said inner layer.

2. A material according to claim 1, wherein the outer layer is not laminated to the intermediate layer.

3. A material according to claim 1, which weighs no more than 500 g/m².

4. A material according to claim 1 which has an air permeability of at least 25 cm³/cm²/sec at 10 mm w.g.

5. A material according to claim 1, which has a water transmission value of at least 1500 g/m²/24 h at 100% RH at 37° C.

6. An article of protective clothing which comprises composite material according to claim 1.

7. An article according to claim 6, said article of clothing including portions adapted to cover a joint or vulnerable part of the wearer's adapted to cover a joint or vulnerable part of the wearer's anatomy, wherein said portions comprise impermeable material.

8. A material according to claim 2, which weighs no more than 500 g/m².

9. A material according to claim 2, which has an air permeability of at least 25 cm³/cm²/sec at 10 mm w.g.

10. A material according to claim 3, which has an air permeability of at least 25 cm³/cm²/sec at 10 mm w.g.

11. A material according to claim 2, which has a water transmission value of at least 1500 g/m²/24 h at 100% RH at 37° C.

12. A material according to claim 3, which has a water transmission value of at least 1500 g/m²/24 h at 100% RH at 37° C.

13. A material according to claim 4, which has a water transmission value of at least 1500 g/m²/24 h at 100% RH at 37° C.

14. An article of protective clothing which comprises composite material according to claim 2.

15. An article of protective clothing which comprises composite material according to claim 3.

16. An article of protective clothing which comprises composite material according to claim 4.

17. An article of protective clothing which comprises composite material according to claim 5.

18. A material according to claim 1 which exhibits chemical protection such that liquid mustard drops applied in isolation will to penetrate the composite material over a period of at least four hours.

19. A material according to claim 1 wherein the intermediate layer comprises an active carbon material including a gas permeable surface coating of particulate hydrophobic material which renders the active carbon waterproof.

20. An article according to claim 6, wherein said layers are fastened together by stitching at seams of the article of clothing.

21. A protective suit adapted to be worn by a person, said suit comprising a composite material that comprises, in combination:
   an outer layer of an abrasion-resistant, water repellent-material;
   an intermediate layer comprising activated charcoal cloth treated to provide liquid-repellency; and
   an inner layer of an abrasion-resistant material;
   said layers being held together by stitching at seams of the protective suit.

* * * * *